(12) United States Patent
Blais et al.

(10) Patent No.: US 6,497,947 B1
(45) Date of Patent: Dec. 24, 2002

(54) INTERIOR AUTOMOTIVE TRIM MEMBER HAVING IMPROVED SCRATCH RESISTANCE AND A METHOD OF MAKING THE SAME

(75) Inventors: Edmund Joseph Blais, Windsor (CA); Joseph C. Cassatta, Taylor, MI (US); Jeffrey Hampton Helms, Plymouth, MI (US); Mo-Fung Cheung, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/375,029

(22) Filed: Aug. 16, 1999

(51) Int. Cl.⁷ ............................................. B32B 27/32
(52) U.S. Cl. ............................... 428/319.3; 428/319.9; 428/515; 428/516; 428/519; 156/77; 156/78; 156/275.5; 264/54; 427/596
(58) Field of Search ................................. 428/515, 516, 428/319.3, 319.9, 517; 264/54, 127.17; 156/77.78, 275.5, 244.17; 427/596

(56) References Cited

U.S. PATENT DOCUMENTS

| | | | |
|---|---|---|---|
| 4,170,664 A | 10/1979 | Spenadel et al. | |
| 4,352,765 A | 10/1982 | Menk et al. | |
| 4,816,313 A | 3/1989 | Hosokawa et al. | |
| 4,863,768 A | 9/1989 | Ishio et al. | |
| 5,362,572 A | 11/1994 | Hamada et al. | |
| 5,407,713 A | 4/1995 | Wilfong et al. | |
| 5,604,043 A | 2/1997 | Ahlgren | |
| 5,702,827 A | 12/1997 | Itoh et al. | |
| 5,972,492 A | * 10/1999 | Murakami et al. | 428/318.8 |
| 5,992,486 A | * 11/1999 | Katsuki et al. | 152/510 |

FOREIGN PATENT DOCUMENTS

| | | |
|---|---|---|
| DE | 4007878 A | 2/1998 |
| EP | 01943752 | 9/1986 |
| EP | 0329490 A2 | 8/1989 |
| JP | 05077274 A | 3/1993 |
| JP | 06182878 A | 7/1994 |

* cited by examiner

*Primary Examiner*—D. Lawrence Tarazand
(74) *Attorney, Agent, or Firm*—Damian Porcari

(57) ABSTRACT

The present invention relates to an interior automotive trim member comprising a backing substrate, a layer of elastomeric material bonded to and overlying the backing substrate, and a soft skin formed of polyolefinic material. The soft skin is bonded to and overlies the layer of elastomeric material. The soft skin is cured by electron beam curing. The present invention also relates to a method of making a soft skin for use with an interior automotive trim member comprising a backing substrate, a layer of elastomeric material bonded to and overlying the backing substrate, and the soft skin bonded to and overlying the layer of elastomeric material. The method comprises providing a polyolefinic material, and exposing the polyolefinic material to electron beam radiation to cure the polyolefinic material.

21 Claims, 1 Drawing Sheet

INTERIOR AUTOMOTIVE TRIM MEMBER HAVING IMPROVED SCRATCH RESISTANCE AND A METHOD OF MAKING THE SAME

TECHNICAL FIELD

This invention relates to an interior automotive trim member, having improved scratch resistance and, more particularly, to an automotive instrument panel having improved scratch resistance.

BACKGROUND ART

Instrument panels for automobiles, and other interior automotive trim members, typically comprise a hard backing substrate, a soft layer of elastomeric material disposed over and bonded to the backing substrate and a soft polymeric skin which is disposed over and bonded to the layer of elastomeric material.

The backing substrate is typically made of a relatively rigid material such as a hard polymeric material or metal. The layer of elastomeric material is relatively soft and preferably has a hardness which is less than the hardness of the skin or the backing substrate.

Polyvinylchloride (PVC) based instrument panels have been widely used. These PVC-based instrument panels typically comprise a hard polymeric backing substrate, a soft polyurethane (PU) foam layer bonded to the backing substrate and a soft PVC skin bonded to the polyurethane foam layer. A coating is usually applied onto the PVC skin for gloss control as well as for lowering the potential of mar and/or scratch damage. This type of instrument panel having a PVC-PU and polymeric backing substrate composite is not environmentally friendly. Recycling of the composite is difficult and sometimes impossible due to the byproducts formed during thermal treatment. Moreover, incineration of the composite is virtually unacceptable because the byproducts are corrosive and toxic.

Another type of instrument panel which has been commonly used comprises a soft polyolefin skin, a polyolefin foam such as polypropylene foam, and a polyolefin backing substrate. As each of the components of the instrument panel are made of polyolefin, recycling and other environmental considerations of the instrument panel are advantageous. However, coatings must be applied to the skin for gloss and scratch resistance control. Typically, in applying the coating, adhesion promoter must be applied in between the coating and the polyolefin soft skin.

The necessity of these coatings adds considerable expense and time to the manufacture of these prior art instrument panels.

It would be desirable to provide an instrument panel which can be easily and more cost effectively manufactured relative to the prior art instrument panels.

It would be further desirable to provide an instrument panel which is scratch resistant and has suitable gloss control without the use of a coating over the soft skin.

It would also be further desirable to provide an instrument panel which can be easily recycled.

DISCLOSURE OF INVENTION

The present invention relates to an interior automotive trim member which comprises a backing substrate, a layer of elastomeric material bonded to and overlying the backing substrate, and a soft skin formed of polyolefinic material. The soft skin is bonded to and overlies the layer of elastomeric material. The soft skin is cured by electron beam curing.

The electron beam curing (treating) of the soft skin results in the soft skin having a scratch resistant surface, thus eliminating the need for a coating on the soft skin. The gloss of the soft skin can be controlled by adding filler to the polyolefinic material. Moreover, the electron beam curing of the polyolefinic material takes place without the addition of any cross-linking catalyst/accelerator to the polyolefinic material.

The present invention also relates to a method of making a soft skin for use with an interior automotive trim member comprising a backing substrate, a layer of elastomeric material overlying and bonded to the backing substrate, and the soft skin overlying and bonded to the layer of elastomeric material. The method comprises providing a polyolefinic material, and exposing the polyolefinic material to electron beam radiation to cure the polyolefinic material.

In one embodiment, the layer of elastomeric material comprises polyolefin foam comprising a curable mixture of a polyolefinic material and a foaming agent. The polyolefinic material of the soft skin and the polyolefin foam of the polyolefinic material of the layer of elastomeric material are exposed to the electron beam radiation simultaneously such that both the polyolefinic material of the soft skin and the polyolefin foam of the layer of elastomeric material cure simultaneously.

In another embodiment, the polyolefinic material of the soft skin is exposed to the electron beam radiation prior to being bonded to the layer of elastomeric material.

In another embodiment, the backing substrate and the layer of elastomeric material also comprise a polyolefinic material to allow for relatively easy recycling of the trim member.

BEST MODE FOR CARRYING OUT THE INVENTION

Figure 1:
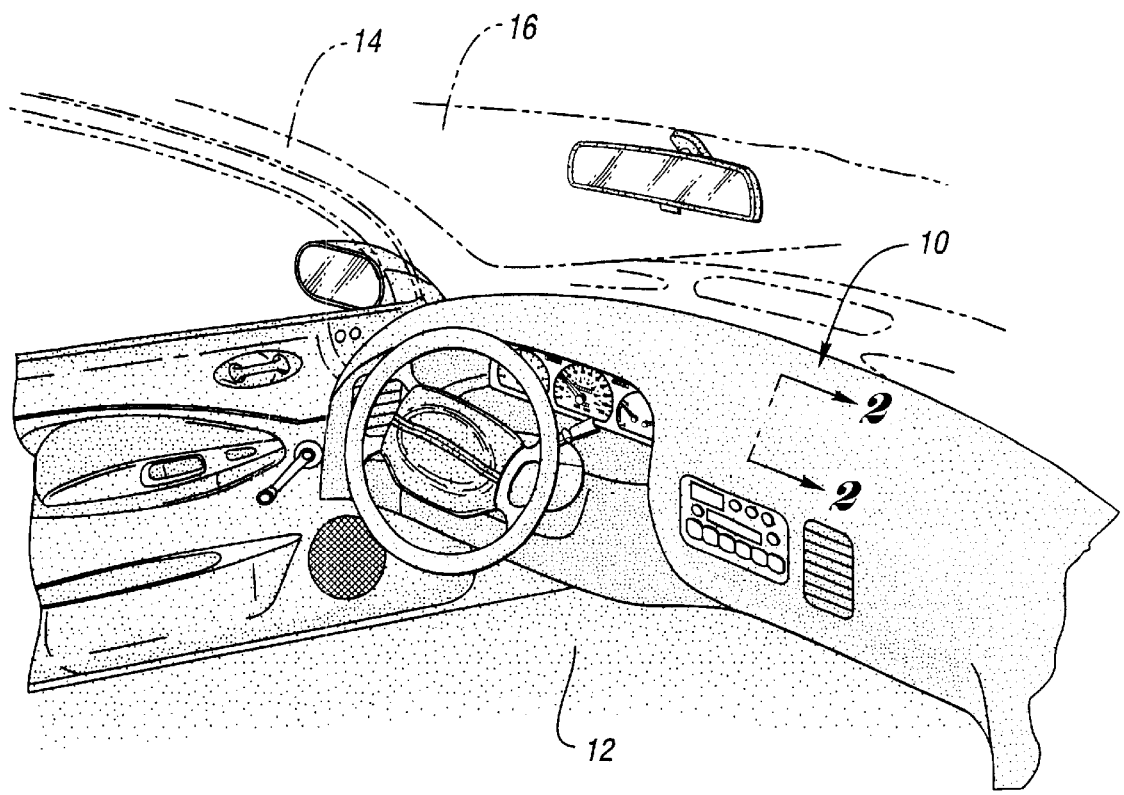
FIG. 1 is a front elevational view of a vehicle instrument panel of an automotive vehicle.

FIG. 1 illustrates a vehicle body having an interior automotive trim member 10. The interior automotive trim member is an instrument panel 10 forward of a passenger compartment 12. The instrument panel 10 extends across the vehicle body between pillars 14 (only one of which is shown) which support a vehicle windshield 16.

Figure 2:
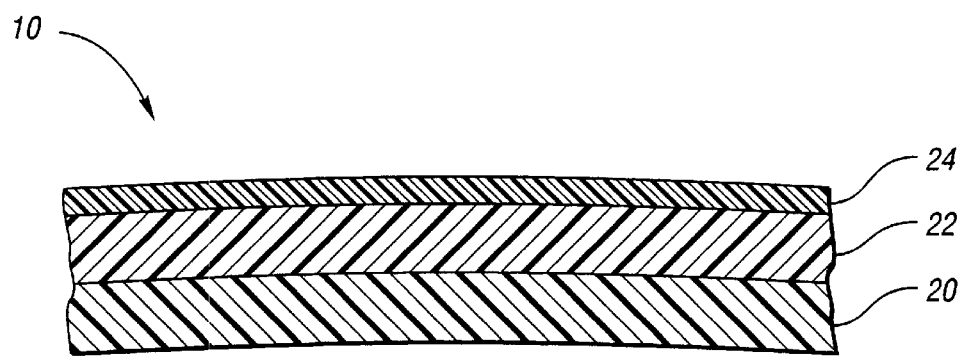
FIG. 2 is a sectional view taken along line 2—2 of FIG. 1.

Referring to FIG. 2, a cross-sectional view of the instrument panel 10 is shown. The instrument panel 10 comprises a backing substrate 20, a layer of elastomeric material 22 and a soft skin layer 24. The layer of elastomeric material 22 overlies and is bonded to the backing substrate 20. The soft skin 24 overlies and is bonded to and overlies the layer of elastomeric material 22.

The backing substrate 20 supports the shape of the instrument panel 10 and allows the instrument panel to attach to the forward end of the vehicle compartment 12 by various attaching portions (not shown) in the backing substrate 20. The backing substrate 20 is preferably formed of a high strength plastic material which can be injection molded. Examples of suitable high strength injectional moldable plastic materials which can be used to form the backing substrate 20 include, but are not limited to, Dylark™ from Arco and Noryl™ from G.E. Other materials that may be used to construct the backing substrate 20 include metal, such as steel, and plastic composite or wood fiber composite materials. Preferably, the backing substrate 20 is a polyolefin substrate which is made of high strength injection moldable filled polyolefinic material. Preferred high strength injection moldable filled polyolefinic materials include, but are not limited to, highly mineral and/or glass filled polypropylene such as the talc filled Escorene™ from Exxon Polymers, and the fiberglass filled Gapex™ from Ferro Corp., and glass fiber and/or mineral filled polypropylene or polypropylene copolymer, such as Hifax™ from Montell USA, Engage™ from Dupont Dow Chemical, and Exxtral™ from Exxon Polymers.

The layer of elastomeric material 22 preferably has an average thickness of from about 2 mm to about 20 mm, more preferably from about 4 mm to about 8 mm, and most preferably from about 3 to about 6 mm. The layer of elastomeric material 22 is preferably formed of a soft durable plastic foam material such as, but not limited to, polyurethane foam, polyvinyl chloride foam, polyester foam, polystyrene foam. The material forming the elastomeric material 22 preferably has a hardness which is less than the hardness of the soft skin 24.

Most preferably, the layer of elastomeric material comprises polyolefin foam. The polyolefin foam preferably comprises a curable mixture of a polyolefinic material, and a suitable foaming agent. The polyolefinic material of the polyolefin foam comprises at least one polyolefin resin, and may preferably comprise a mixture of polyolefin resins. The polyolefin resins are preferably saturated. Examples of suitable polyolefin resins for making the polyolefin elastomeric material include, but are not limited to, polyethylene, polypropylene and ethylene-propylene copolymer. Suitable examples of foaming agents include, but are not limited to, modified azodicarbonamide, p-toluene sulfonyl semicarbazide and combinations thereof. The polyolefinic material of the polyolefin foam is cured by any suitable manner, and is preferably cured by exposure to electron beam radiation.

The soft skin 24 preferably has an average thickness of from about 0.75 mm to about 1.5 mm, more preferably from about 0.90 mm to about 1.40 mm, and most preferably from about 1.0 to about 1.25 mm. The soft skin 24 is formed of a polyolefinic material. The polyolefinic material preferably comprises from about 90 to 100 weight percent of polyolefin-based resin (i.e., olefinic resin), based on the weight of the polyolefinic material, and from about 0 to about 10 weight percent inorganic filler. More preferably, the polyolefinic material comprises from about 95 to 98 weight percent of polyolefin-based resin, based on the weight of the polyolefinic material, and from about 2 to about 5 weight percent inorganic filler. By polyolefin-based resins, it is meant a resin comprising 100 weight percent polyolefin resin, based on the weight of the polyolefin-based resin, or a copolymer comprising at least one polyolefin resin, with the copolymer comprising, by weight, at least about 50 weight percent polyolefin resin.

Suitable polyolefin resins include, but are not limited to, ethylene-propylene rubber (EPM), ethylene-propylene-diene-monomer (EPDM), polypropylene (PP), polyethylene (PE), thermoplastic olefin (TPO), and ethylene-propylene copolymers with long branch side chains. Examples of suitable long branch side chains include, but are not limited to, $C_{6-12}$ straight chain hydrocarbon groups and preferably $C_8$ straight chain hydrocarbon groups. Most preferably, the hydrocarbon groups are saturated.

The polyolefin-based resin may also comprise acid functionalized polyolefin resins such as, but not limited to acrylic acid/polyolefin copolymers. Suitable examples of such copolymers include, ethylene-methacrylic acid copolymer such as Surlyn™ from Dupont. If present, the acid functionalized resin may be present in the polyolefin-based resin in an amount of less than about 30 weight percent, based on the weight of polyolefin-based resin, and more preferably in an amount of from about 5 to about 15 weight percent.

The polyolefin-based resin component of the polyolefinic material of the soft skin 24 must have some degree of unsaturation. Preferably, the polyolefinic-based resin comprises at least about 20 to about 80 weight percent, based on the weight of the polyolefin-based resin, of unsaturated polyolefin resin, and more preferably between about 40 to about 60 weight percent of unsaturated polyolefin resin.

The polyolefinic material is prepared by compounding the polyolefin-based resin with the filler in conventional compound equipment such as a single or twin-screw extruder, brabender or banbury mixer, 2-roll mill, and calendars.

The extruded or calendared (i.e., processed) polyolefinic material is then placed under an electron beam producing apparatus (i.e., exposed to electron beam radiation) to undergo curing. The electron beam apparatus is conventional and may be any of the low voltage models, such as EPS-300-25-18-C, manufactured by High Voltage Engineering Corporation of Berltan, Massachusetts. Suitable electron beam apparatuses include electron scanning and cathode tube electron beam apparatuses.

The curing takes place preferably in an inert atmosphere such as nitrogen. The electron beam apparatus is preferably operated at an energy level of between about 5 to about 50 megarad, and more preferably between about 15 to about 30 megarad, and most preferably, about 20 megarad. The soft skin 24 of the present invention is rendered virtually scratch resistant after undergoing the electron beam curing. Moreover, the gloss of the soft skin 24 of the present invention is controlled by the incorporation of the inorganic fillers in the polyolefinic material.

The soft skin 24, being formed from the electron beam cured polyolefinic material, does not have any coatings applied thereto for gloss control or scratch resistance. As such, the polyolefinic material includes up to about 10 weight percent, based on the weight percent of the polyolefinic material of inorganic fillers such as talc, mica, and fumed silica.

In one embodiment, the layer of elastomeric material 22 is polyolefin foam. The polyolefin foam comprises a polyolefinic resin material mixed with a foaming agent. In this embodiment, a composite formed of both the layer of elastomeric material 22 and the soft skin 24 is cured by electron beam radiation such that both the layer of elastomeric material and the soft skin are cured at the same time. The electron beams can be generated from one electron beam apparatus directing electron beams at one side only of the composite—either at the layer of elastomeric material side or at the soft skin 24 side. Alternatively, the electron beams can be generated from at least two electron beam apparatuses oriented in differing positions and angles, and preferably with at least one electron beam apparatus directed at (i.e., facing) the layer of elastomeric material 22 side and with at least one electron beam apparatus directed at (i.e., facing) the soft skin 24 side. Thus, in this embodiment, the foaming step for the layer of elastomeric material 22 and the curing step of the soft skin 24 occur at the same time under one electron beam irradiating step. In this embodiment, the soft skin 24 and the layer of elastomeric material are formed together, preferably by calendaring.

In another embodiment, the soft skin 24 is cured (i.e., exposed to electron beam radiation) prior to being bonded to the layer of elastomeric material 22. The cured soft skin 24 is then subsequently bonded to the layer of elastomeric material 22.

Having generally described the present invention, a further understanding can be obtained by reference to certain specific examples which are provided herein for purpose of illustration only and are not intended to be limiting unless otherwise specified.

EXAMPLE 50 parts by weight of Buna EPT 6470 (an unsaturated EPDM resin) from the Bayer Corporation is compounded with 50 parts by weight Engage 8180 (a polyethylene resin having saturated hydrocarbon side chains) from the Dow Chemical Corporation in a single screw laboratory extruder and subsequently pelletized at sub-zero temperature. The extrudate was then dried and injection molded into 3×8×0.25 inch plaques. The plaques were electron beam irradiated using a 20 megarad dose under a nitrogen atmosphere. After undergoing a preliminary laboratory scratch test, the resulting surfaces of the plaques were observed to be essentially scratch free.

Comparative Example

A similar mixture was injection molded into a 3×8×0.25 plaques. After undergoing a preliminary laboratory scratch test, the resulting surfaces of the plaques were observed to have an unacceptably high level of scratches.

The present invention by virtue of eliminating the coating which typically covers a soft skin in an instrument panel significantly reduces the cost and manufacturing time of an instrument panel significantly. Also, additional cost and time savings can be realized when the layer of elastomeric material is a polyolefin foam and the polyolefinic materials of the polyolefin foam and the soft skin are cured simultaneously by exposure to electron beam radiation.

It should be noted that while the above invention was mainly described with respect to instrument panels, the soft skin of the present invention can be used in other soft skin applications such as other interior automotive trim members such as door panels.

While the best modes for carrying out the invention have been described in detail, those familiar with the art to which this invention relates will recognize various alternative designs and embodiments for practicing the inventions as defined by the following claims.

What is claimed is:

1. An interior automotive trim member for use in a vehicle compartment, said trim member comprising:
   a backing substrate having attaching portions for attaching said trim member to the vehicle compartment;
   a layer of elastomeric material bonded to and overlying the backing substrate; and
   a soft skin formed of polyolefinic material, the soft skin being bonded to and overlying the layer of elastomeric material, the soft skin being cured by electron beam curing.

2. The interior automotive trim member of claim 1 wherein the polyolefinic material comprises from about 90 to about 100 weight percent olefinic resin and from about 0 to about 10 weight percent filler.

3. The interior automotive trim member of claim 2 wherein the olefinic resin comprises from about 20–80 weight percent unsaturated polyolefin resin, based on the weight of the olefinic resin.

4. The interior automotive trim member of claim 3 wherein the olefinic resin comprises (meth)acrylic olefin copolymer.

5. The interior automotive trim member of claim 2 wherein the olefinic resin comprises from about 0 to about 30 weight percent acid functionalized polyolefin copolymers, based on the weight of the olefinic resin.

6. The interior automotive trim member of claim 1 wherein the electron beam curing takes place in an inert atmosphere and with a dosage of about 5 to about 50 megarads.

7. The interior automotive trim member of claim 1 wherein the layer of elastomeric material comprises polyolefin foam.

8. The interior automotive trim member of claim 7 wherein the backing substrate comprises a polyolefinic substrate.

9. The interior automotive trim member of claim 1 wherein the polyolefinic material is free of cross-linking catalysts.

10. The interior automotive trim member of claim 1 wherein the polyolefinic material comprises olefinic resin and filler.

11. A method of making an interior automotive trim member for use in a vehicle compartment, said method comprising:
    providing a base member comprising a backing substrate and a layer of elastomeric material bonded to and overlying the backing substrate, the backing substrate having attaching portions for attaching the trim member to the vehicle compartment;
    providing a layer of polyolefinic material over at least a portion of the layer of elastomeric material; and
    exposing the polyolefinic material to electron beam radiation to cure the polyolefinic material to form a soft skin that is bonded to and overlies at least a portion of the layer of elastomeric material.

12. The method of claim 11 wherein the polyolefinic material comprises from about 90 to about 100 weight percent olefin resin and from 0 to about 10 weight percent filler.

13. The method of claim 12 wherein the polyolefinic material is exposed to about 5 to about 50 megarads of electron beam radiation.

14. The method of claim 13 wherein the electron beam radiation occurs in an inert atmosphere.

15. The method of claim 12 wherein the olefin resin comprises from about 20–80 weight percent unsaturated polyolefin resin, based on the weight of the olefin resin.

16. The method of claim 12 wherein the layer of elastomeric material comprises polyolefin foam comprising a curable mixture of polyolefinic material and foaming agent, the polyolefinic materials of the soft skin and the polyolefin foam of the layer of elastomeric material are exposed to the electron beam radiation essentially simultaneously such that the polyolefinic materials of both the soft skin and the polyolefin foam of the layer of elastomeric material cure essentially simultaneously.

17. The method of claim 16 wherein one electron beam apparatus is provided to cure the polyolefinic material of the soft skin and the polyolefin foam of the layer of elastomeric material.

18. The method of claim 16 wherein two electron beam apparatuses are provided to cure the polyolefinic materials of both the soft skin and the polyolefin foam of the layer of elastomeric material.

19. The method of claim 12 wherein the polyolefinic material of the soft skin is exposed to the electron beam radiation prior to being bonded to the layer of elastomeric material.

20. An interior automotive trim member comprising:

a backing substrate;

a polyolefin foam layer of elastomeric material bonded to and overlying the backing substrate; and a soft skin formed of polyolefinic material, the soft skin being bonded to and overlying the layer of elastomeric material, the soft skin being cured by electron beam curing.

21. A method of making a soft skin for use with an interior automotive trim member comprising a backing substrate, a layer of elastomeric material bonded to and overlying the backing substrate, with the soft skin being bonded to and overlying the layer of elastomeric material, the method comprising:

providing a polyolefinic material; and exposing the polyolefinic material to electron beam radiation to cure the polyolefinic material;

wherein the layer of elastomeric material comprises polyolefin foam comprising a curable mixture of polyolefinic material and foaming agent, the polyolefinic materials of the soft skin and the polyolefin foam of the layer of elastomeric material are exposed to the electron beam radiation essentially simultaneously such that the polyolefinic materials of both the soft skin and the polyolefin foam of the layer of elastomeric material cure essentially simultaneously.

* * * * *